United States Patent
Kang et al.

(10) Patent No.: US 11,579,975 B2
(45) Date of Patent: Feb. 14, 2023

(54) METHOD, DEVICE, AND COMPUTER READABLE STORAGE MEDIUM FOR MANAGING REDUNDANT ARRAY OF INDEPENDENT DISKS

(71) Applicant: EMC IP Holding Company LLC, Hopkinton, MA (US)

(72) Inventors: Jianbin Kang, Beijing (CN); Jian Gao, Beijing (CN); Geng Han, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 497 days.

(21) Appl. No.: 16/579,991

(22) Filed: Sep. 24, 2019

(65) Prior Publication Data

US 2020/0133775 A1 Apr. 30, 2020

(30) Foreign Application Priority Data

Oct. 25, 2018 (CN) .......................... 201811250935.X

(51) Int. Cl.
*G06F 11/00* (2006.01)
*G06F 11/10* (2006.01)
*G06F 11/20* (2006.01)
*G06F 3/06* (2006.01)

(52) U.S. Cl.
CPC .......... *G06F 11/1084* (2013.01); *G06F 3/065* (2013.01); *G06F 3/0611* (2013.01); *G06F 3/0613* (2013.01); *G06F 3/0647* (2013.01); *G06F 3/0689* (2013.01); *G06F 11/2094* (2013.01)

(58) Field of Classification Search
CPC ............ G06F 11/1084; G06F 11/2094; G06F 3/0611; G06F 3/0613; G06F 3/0689
See application file for complete search history.

(56) References Cited

U.S. PATENT DOCUMENTS

| | | | | |
|---|---|---|---|---|
| 7,389,379 B1 * | 6/2008 | Goel | ................... | G06F 11/1662 714/6.32 |
| 8,467,281 B1 * | 6/2013 | Colon | ................. | G06F 11/3485 369/47.1 |
| 9,189,334 B2 | 11/2015 | Bennett | | |
| 9,632,870 B2 | 4/2017 | Bennett | | |
| 10,514,978 B1 | 12/2019 | Lee et al. | | |
| 10,733,042 B2 | 8/2020 | Gao et al. | | |
| 10,761,761 B2 | 9/2020 | Zhuo et al. | | |
| 2005/0210318 A1 * | 9/2005 | Marks | ................. | G06F 11/0727 714/6.32 |

(Continued)

FOREIGN PATENT DOCUMENTS

| | | |
|---|---|---|
| CN | 105094684 | 11/2015 |
| CN | 108228086 | 6/2018 |

OTHER PUBLICATIONS

The Patent Office of The People's Republic of China; Search Report for CN201811250935X; dated Dec. 22, 2022; 3 pages.

*Primary Examiner* — Philip Guyton
(74) *Attorney, Agent, or Firm* — BainwoodHuang

(57) ABSTRACT

Techniques manage a redundant array of independent disks. In such a technique, a response time of a first storage device in the RAID is compared to a first threshold. In response to the response time of the first storage device exceeding the first threshold, the first storage device is configured as a pseudo-degraded storage device, such that the pseudo-degraded storage device is responsive to write requests only.

20 Claims, 11 Drawing Sheets

(56) References Cited

U.S. PATENT DOCUMENTS

| | | | |
|---|---|---|---|
| 2015/0234719 A1* | 8/2015 | Coronado | G06F 3/0683 714/6.3 |
| 2016/0246669 A1 | 8/2016 | Coronado et al. | |
| 2018/0300211 A1 | 10/2018 | Yang et al. | |
| 2020/0133775 A1* | 4/2020 | Kang | G06F 3/0689 |

* cited by examiner

METHOD, DEVICE, AND COMPUTER READABLE STORAGE MEDIUM FOR MANAGING REDUNDANT ARRAY OF INDEPENDENT DISKS

CROSS-REFERENCE TO RELATED APPLICATION(S)

This application claims priority to Chinese Patent Application No. CN201811250935.X, on file at the China National Intellectual Property Administration (CNIPA), having a filing date of Oct. 25, 2018, and having "METHOD, DEVICE, AND COMPUTER READABLE STORAGE MEDIUM FOR MANAGING REDUNDANT ARRAY OF INDEPENDENT DISKS" as a title, the contents and teachings of which are herein incorporated by reference in their entirety.

FIELD

Embodiments of the present disclosure generally relate to a storage device, and more specifically, to a method, a device and a computer readable storage medium for managing a Redundant Array of Independent Disks (RAID).

BACKGROUND

The RAID is a data storage virtualizing technology that combines a plurality of physical storage devices into one or more logical units, for purposes of data redundancy, performance improvement and so on. If a storage device in the RAID has an overlong response time or an exceedingly high input/output (I/O) load, the response of the storage system probably times out. In some applications where the I/O load is substantially balanced on a plurality of storage devices, the impact of the above phenomenon on the system performance is particularly outstanding. Therefore, it is necessary to provide a solution at least partly solving this problem.

SUMMARY

The embodiments of the present disclosure provide a method, a device and a computer program product for managing a RAID.

In a first aspect, there is provided a method of managing a RAID. The method includes: comparing a response time of a first storage device in the RAID to a first threshold; and in response to the response time of the first storage device exceeding the first threshold, configuring the first storage device as a pseudo-degraded storage device, such that the pseudo-degraded storage device is responsive to write requests only.

In a second aspect, there is provided a device for managing a RAID. The device includes: a processing unit; and a memory coupled to the processing unit and including instructions stored thereon, the instructions when executed by the processing unit causing the device to perform acts including: comparing a response time of a first storage device in the RAID to a first threshold; and in response to the response time of the first storage device exceeding the first threshold, configuring the first storage device as a pseudo-degraded storage device, such that the pseudo-degraded storage device is responsive to write requests only.

In a third aspect, there is provided a computer-readable storage medium including machine-executable instructions stored thereon which, when executed by at least one processor, cause the at least one processor to perform the method according to the first aspect.

In a fourth aspect, there is provided a computer program product stored on a computer-readable medium and including machine-executable instructions which, when executed, cause a machine to perform the method according to the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent. In the drawings, the same reference sign usually refers to the same component in the example embodiments of the present disclosure.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred embodiments disclosed herein will be described in detail below with reference to the accompanying drawings. Although the drawings illustrate the preferred embodiments of the present disclosure, it would be appreciated that the present disclosure can be implemented in various forms but cannot be limited by the embodiments described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

Figure 1:
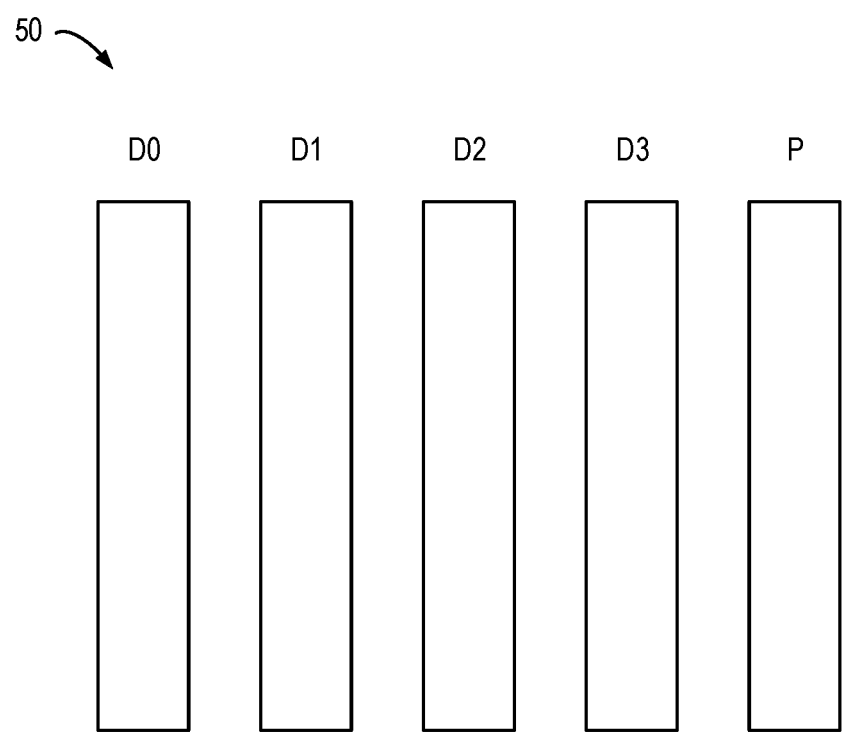
FIG. 1 illustrates a diagram of a RAID according to some embodiments of the present disclosure.

FIG. 1 illustrates a diagram of a RAID 50 according to some embodiments of the present disclosure. As shown in FIG. 1, the RAID 50 includes a plurality of storage devices or storage nodes which are represented as D0-D3 and P in FIG. 1, where P denotes a parity storage device. The storage device or storage node can be any appropriate type of storage device, such as a drive, disk, Solid State Device (SSD) or the like. It would be appreciated that, although FIG. 1 illustrates an example RAID, the embodiments of the present disclosure can be applied to other types of RAIDs, and the present disclosure is not limited herein.

In the RAID technology, for each I/O, the RAID splits the I/O to different storage devices in the RAID 50 and waits for completion of these I/Os. Therefore, the response time of the RAID 50 is determined by the longest response time of these storage nodes, and the slowest storage node becomes a performance bottleneck of the RAID 50.

Figure 2:
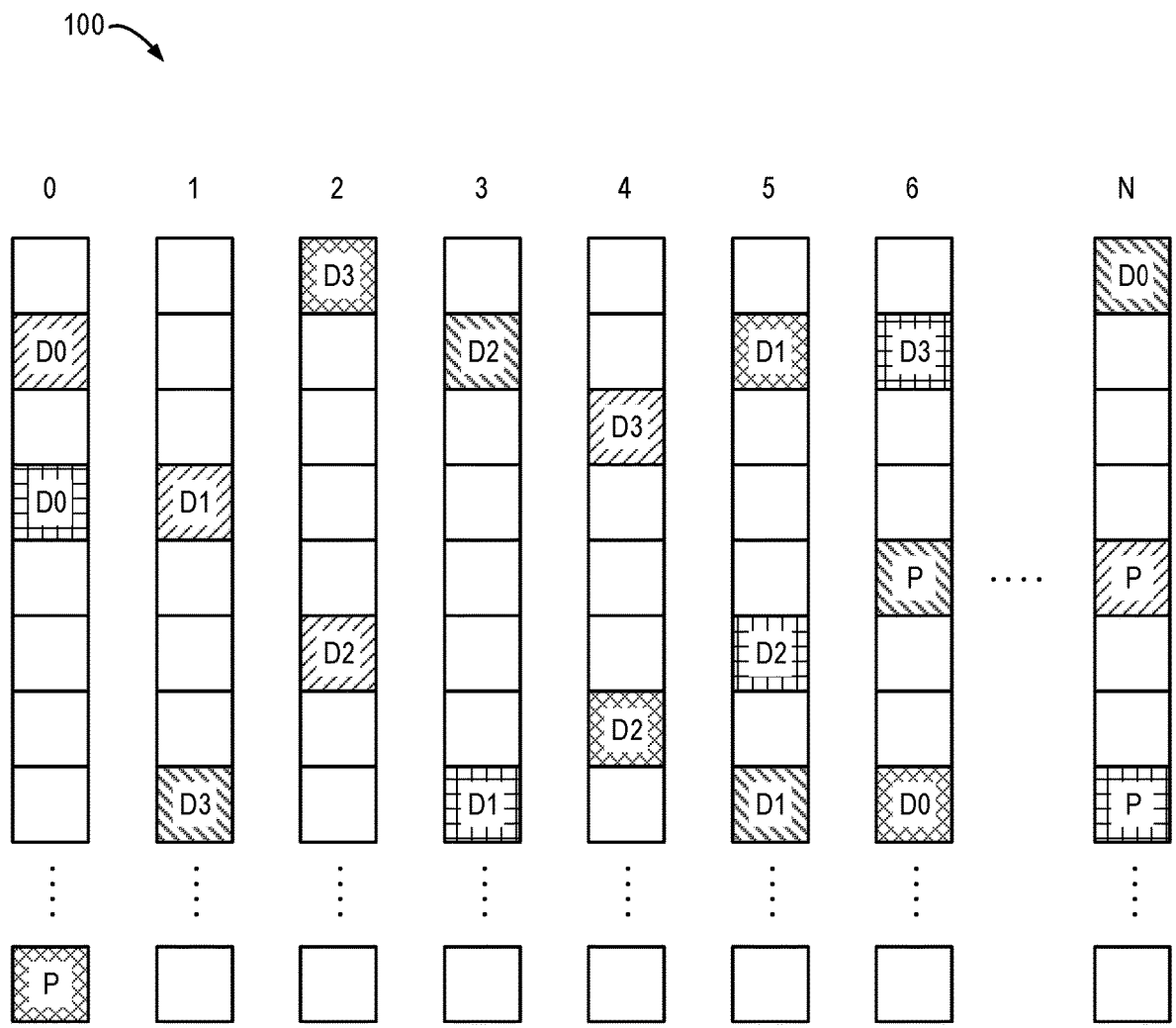
FIG. 2 illustrates a diagram of a mapped RAID according to some embodiments of the present disclosure.
Figure 2:
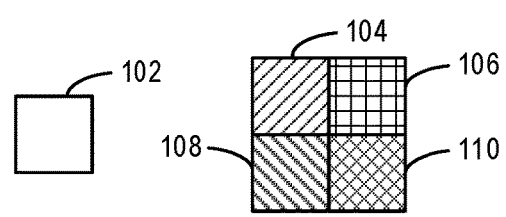

FIG. 2 illustrates a diagram of a mapped RAID 100 according to some embodiments of the present disclosure. As shown in FIG. 2, the mapped RAID 100 includes N storage nodes, each of which includes a plurality of storage extents. The mapped RAID can also be referred to as a dynamic pool. A plurality of storage extents distributed over different storage nodes form a RAID extent, and each RAID extent can be regarded as a RAID 50 as shown in FIG. 1. For example, patterns 104, 106, 108 and 110 each represent a RAID extent. For example, storage extents D0-D3 and P, as represented by the pattern 104, form a RAID extent, storage extents D0-D3 and P, as represented by the pattern 106, form a RAID extent, storage extents D0-D3 and P, as represented by the pattern 108, form a RAID extent, and storage extents D0-D3 and P, as represented by the pattern 110, form a RAID extent. It would be appreciated that any other number of storage nodes, storage extents and RAID extents can be used, and the present disclosure is not limited herein.

In the mapped RAID 100, there is a great number (for example, 64) of storage nodes, and the mapped RAID 100 balances the I/O over substantially all the storage nodes. Therefore, many I/Os do not arrive at the slowest storage node. For example, for a 4+1 mapped RAID with 64 storage nodes, the possibility of arriving at the slowest node is less than 7%. Consequently, in the mapped RAID 100, the host will suffer from slight performance drop if only one storage node becomes slower. However, since the I/O load on all storage devices are balanced while creating a mapped RAID, the number of I/Os pending on slowest storage node is increasing as the host cannot slow down the I/O speed significantly. In the case, the host will find that response time of some I/Os is much greater than others, which is quite bad for a storage system.

In view of the above technical problem, the embodiments of the present disclosure provide a solution of managing a RAID. Some embodiments will be described in detail with reference to FIGS. 3-10.

Figure 3:
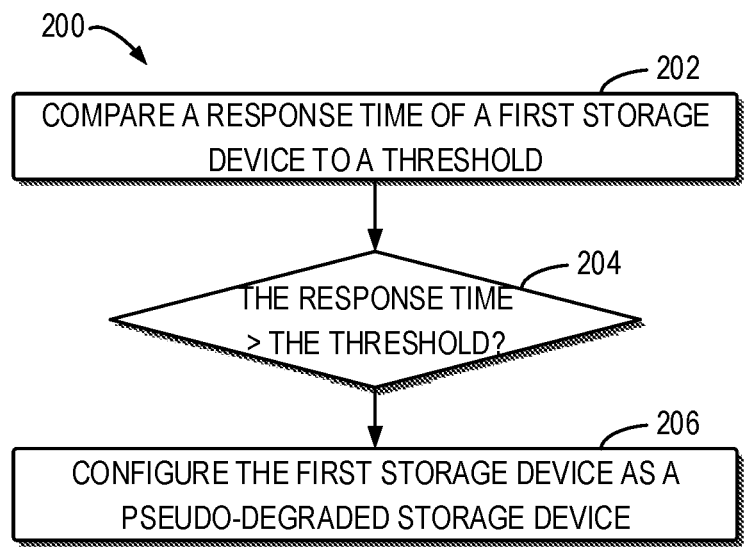
FIG. 3 illustrates a flowchart of a method of managing a RAID according to some embodiments of the present disclosure.

FIG. 3 illustrates a flowchart of the method 200 of managing a RAID according to some embodiments of the present disclosure. The method 200 can be applied to the RAID 50 as shown in FIG. 1 or the RAID 100 as shown in FIG. 2.

At block 202, a response time of a storage device of a RAID is compared to a first threshold. For example, the first storage device may be the storage device or storage node with the longest response time in the RAID. The first threshold can be configured, which can be 2 seconds for an SSD, for example, or which can be 10 seconds for a Serial Attached Small Computer System Interface (SCSI) (SAS), for example.

At block 204, it is determined whether the response time of the first storage device exceeds the first threshold. If yes, the method 200 moves to block 206. At block 206, the first storage device is configured as a pseudo-degraded storage device, such that the pseudo-degraded storage device is responsive to write requests only. For example, if the first storage device is a storage device 2 as shown in FIG. 2, the storage extents D2 and D3 in the storage device 2 are both configured as pseudo-degraded extents.

In some embodiments, if a read request for reading data from the pseudo-degraded storage device is received, the data will be read from other storage devices of the RAID. FIG. 3 illustrates a diagram of a read operation according to some embodiments of the present disclosure. In FIG. 3, D0-D3 and P can represent storage devices in the RAID 50, as shown in FIG. 1, or can represent storage extents in the mapped RAID 100 forming a RAID extent, as shown in FIG. 2. For ease of description, it will be described below with reference to FIG. 2, but it would be appreciated that the solution is also applicable to the RAID 50 as shown in FIG. 1.

As shown in FIG. 3, the storage extent D2 is marked as a pseudo-degraded extent. If a read request for the degraded extent D2 is received, data are read from normal extents D0, D1, D3 and P, for calculating data stored in the pseudo-degraded extent D2. It would be appreciated that the calculation method is determined by the specific type of the RAID, which may vary with the type of the RAID. For example, in the example as shown in FIG. 3, the data stored in the pseudo-degraded extent D2 can be calculated by D2=D0☐D1☐D3☐P, where the symbol ☐ denotes an XOR operation.

Figure 4:
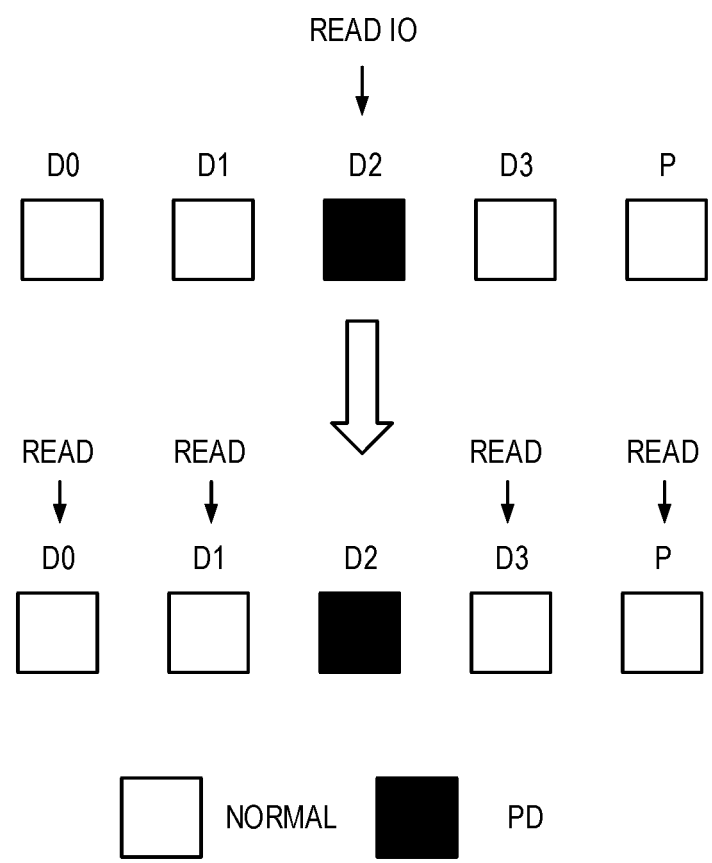
FIG. 4 illustrates a diagram of a read operation according to some embodiments of the present disclosure.
Figure 5:
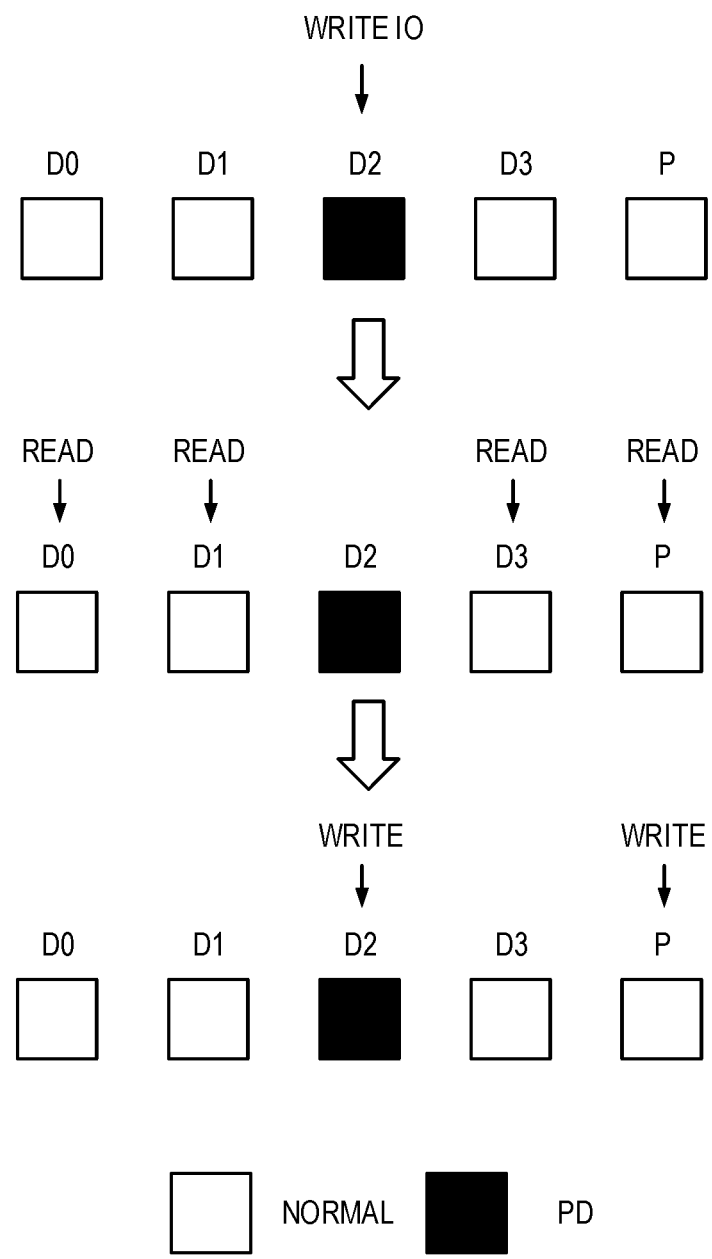
FIG. 5 illustrates a diagram of a write operation according to some embodiments of the present disclosure.

In some embodiments, if a write request for writing data to a pseudo-degraded storage device is received, the data is still written to the pseudo-degraded storage device. FIG. 4 illustrates a diagram of a write operation according to some embodiments of the present disclosure. In FIG. 4, D0-D3 and P may represent storage devices in the RAID 50, as shown in FIG. 1, or represent storage extents in the mapped RAID 100 forming a RAID extent, as shown in FIG. 2. For ease of description, it will be described with reference to FIG. 2, but it would be appreciated that the solution can be applied to the RAID 50 as shown in FIG. 1.

In a conventional write operation, if a write request for the storage extent D2 is received, the data D2 and P stored originally can be read from the storage extents D2 and P, and an XOR operation is carried out for D2 and P, as well as new data D2' to be written, to calculate new parity data P', i.e., P'=P⊕D2⊕D2'. Since the storage extent D2 does not perform a read operation any longer, it is unable to obtain the data D2 stored therein from the storage extent. In the case, similar to the read operation as shown in FIG. 3, data can be read from the storage extents D0, D1 and D3, which are represented as D0, D1 and D3, respectively. New parity data P'=D0⊕D1⊕+D2'⊕D3 are calculated based on the data D0, D1 and D3 and the data D2' to be written.

As shown in FIG. 4, the data D2' and P' can be written into the storage extents D2 and P, respectively, to complete the write operation. It is noted that, although it is unnecessary to read the old parity data when calculating new parity data, in some embodiments the old parity data P can be additionally read to verify data consistency between the storage devices.

According to embodiments of the present disclosure, with the pseudo-degrading solution, the RAID per se is not degraded since data is still written to the RAID. It does not decrease the reliability of the RAID, thereby being advantageous for the RAID. In addition, once the storage device is marked or configured as PD, no read I/Os will be sent to the storage device. Since the pseudo-degraded storage node only responds to the write request, the I/O load of the slow storage node can be lowered quickly.

In some embodiments, if the response time of the pseudo-degraded storage device decreases below a second threshold, the pseudo-degraded storage device is configured as a normal storage device. For example, the second threshold may be less than the first threshold, for example, 1/10 of the first threshold. In some embodiments, in order to prevent ping-pong effect, the pseudo-degraded storage device can be configured as a normal storage device to perform read and write operations after the response time decreases below the second threshold for a certain period of time. In the way, if the storage device becomes normal again, there is no need of rebuilding the RAID.

Figure 6:
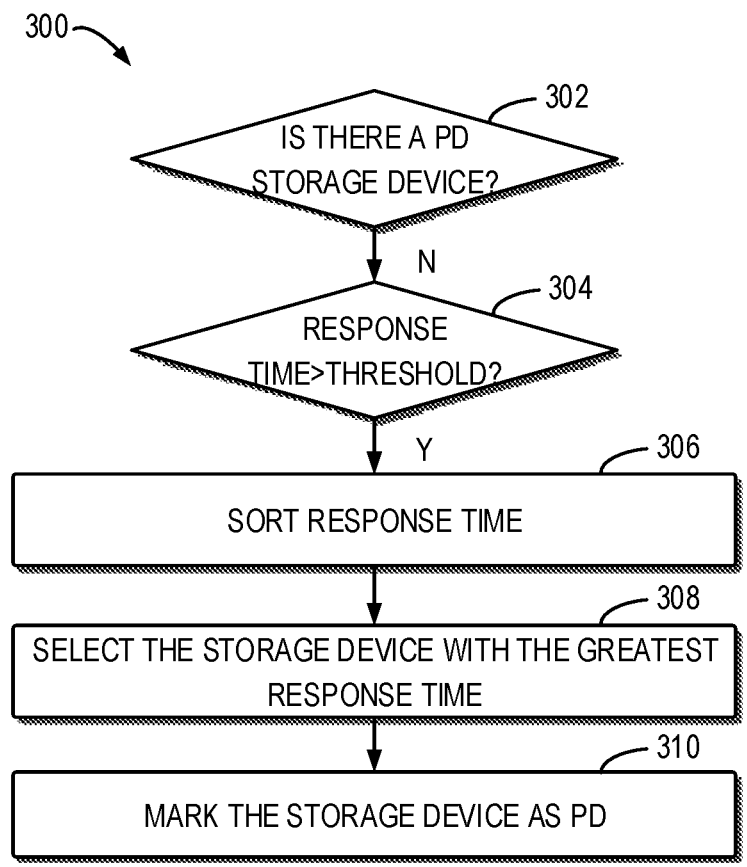
FIG. 6 illustrates a flowchart of a method of managing a RAID according to some embodiments of the present disclosure.

FIG. 6 illustrates a flowchart of the method 300 of managing a RAID according to some embodiments of the present disclosure. The method 300 can be applied to the RAID 50 as shown in FIG. 1 or the RAID 100 as shown in FIG. 2. At block 302, it is determined whether there is a pseudo-degraded (PD) storage device in the RAID. If it is determined at block 302 that there is no PD storage device, the method 300 moves to block 304. At block 304, the method 300 determines whether there is a storage device with a response time greater than the first threshold in the RAID. If yes, the method 300 moves to block 306. At block 306, the method 300 includes sorting the response time of the storage devices in the RAID. At block 308, the storage device with the longest response time will be determined. At block 310, the storage device will be marked as PD.

For some SSDs, the slowness may be temporary. After the storage device is marked as PD, the I/O load on the storage device will be reduced. Therefore, the temporary performance drop can be recovered shortly. In order to eliminate the ping-pong effect, the PD mark is cleared after a period of time since the response time of the storage device is less than the second threshold. The second threshold can be less than the first threshold, which can be 1/10 of the first threshold, for example, 200 ms for the SSD.

In some embodiments, even if the pseudo-degraded storage device only responds to write requests, the I/O load of the pseudo-degraded storage device cannot be significantly reduced, or even, the load of the pseudo-degraded storage device may be continuously increasing. For example, if the response time of the pseudo-degraded storage device exceeds a third threshold, the write request for the extent with the highest write load within the pseudo-degraded storage device will be ignored. For example, the third threshold can be greater than the first threshold.

Figure 7:
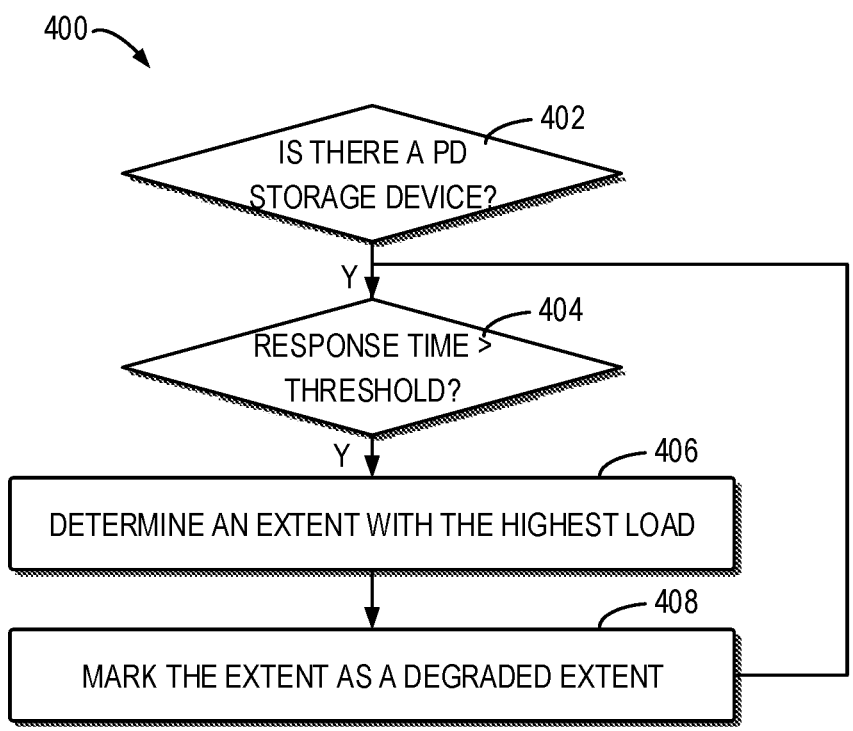
FIG. 7 illustrates a flowchart of a method of managing a RAID according to some embodiments of the present disclosure.

FIG. 7 illustrates a flowchart of the method 400 according to some embodiments of the present disclosure. The method 400 can be applied to the mapped RAID 400 as shown in FIG. 2. As described above, even if the method 200 as shown in FIG. 2 or the method 300 as shown in FIG. 3 is implemented, the response time of the storage device may still be great, and the number of pending I/Os may still be increasing. For example, if the SSD is performing background garbage collection, the SSD may still be slow if only the read I/Os are eliminated. In the case, it is required to further reduce the write I/Os. If a great number of write I/Os are further sent to the storage device, the garbage collection may last for a long time and cause host to timeout. However, it is not feasible to simply mark the storage device dead, because it will increase degraded window of the mapped RAID, causing degradation of the RAID.

As shown in FIG. 7, at block 402, it is determined whether there is a PD storage device in the RAID 100. If yes, the method 400 moves to block 404 where it is determined whether the response time of the PD storage device is greater than the second threshold. The second threshold may be configured, which can be 5 seconds for the SSD or 15 seconds for the SAS, for example. If it is determined at block 404 that the response time of the PD storage device is greater than the second threshold, the method 400 moves to block 406. At block 406, the method 400 determines the storage extent with the highest write load within the PD storage device. At block 408, the storage extent is configured as a degraded extent, and for example, the storage extent can be marked as a degraded extent. The method 400 will ignore the write request for the degraded extent. Then, the method 400 can move to block 404 for iteration. Before proceeding to block 404, the method 400 can wait for a period of time, for example, 10 seconds.

Figure 8:
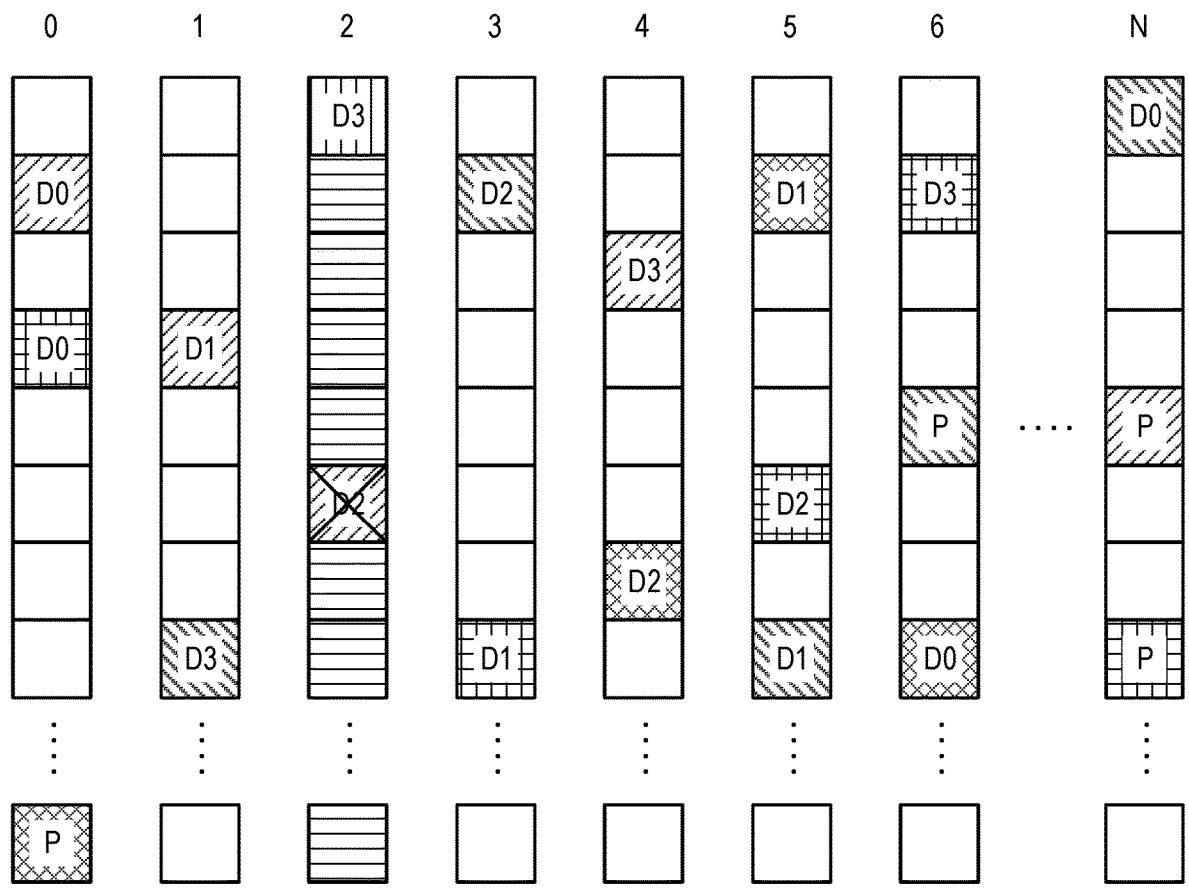
FIG. 8 illustrates a diagram of a mapped RAID including a degraded extent according to some embodiments of the present disclosure.
Figure 8:
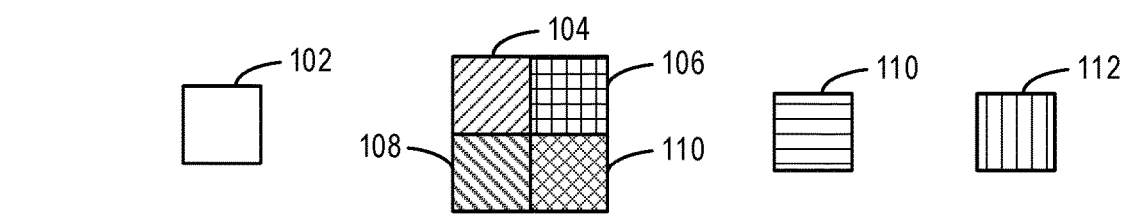

FIG. 8 illustrates a diagram of a mapped RAID 100 including a degraded extent according to some embodiments of the present disclosure. In FIG. 8, the pattern 110 represents a spare pseudo-degraded extent, and the pattern 112 represents a pseudo-degraded extent in use. As shown in FIG. 8, the storage device 2 is a pseudo-degraded storage device, where the storage extent D2 in the storage device 2 is marked as a pseudo-degraded extent. In the case, the storage extent D2 in the storage device 2 will not process the write request any longer.

After the storage extent is marked as a degraded extent, the degraded extent can be rebuilt by some methods currently known or to be developed in the future. In some embodiments, if the number of degraded extents in a storage device exceeds a predetermined threshold, the storage device is marked as a degraded storage device. For example, the number of degraded extents can be determined iteratively. For example, the degraded extent is set by executing the method 400 iteratively, to determine the number of the degraded extents.

In some embodiments, the degraded extents can be added to a list of degraded extents in the pseudo-degraded storage device. If the number of the degraded extents within the list of the degraded extents exceeds a predetermined threshold, the extents (particularly, the extents in use) on the pseudo-degraded storage device are migrated to one or more other storage devices or storage nodes in the RAID.

Figure 9:
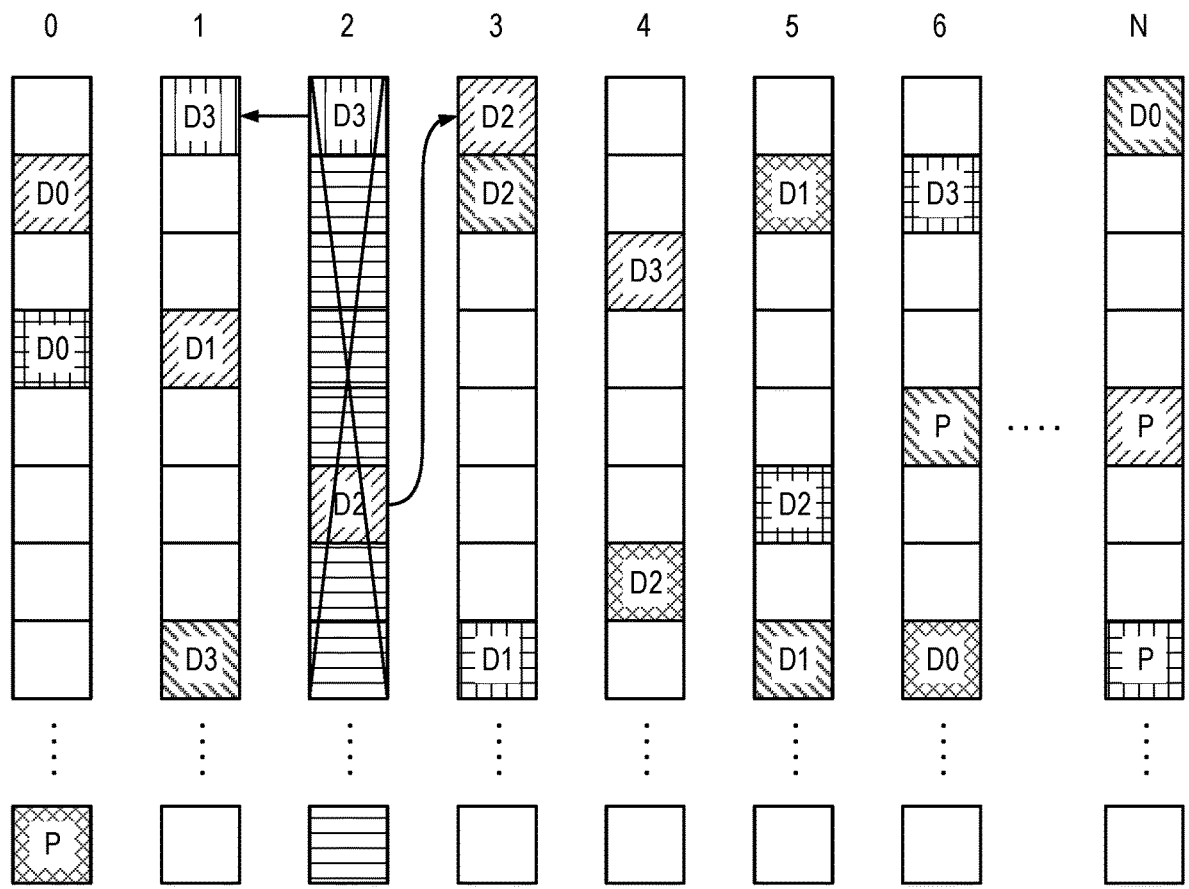
FIG. 9 illustrates a diagram of a mapped RAID including a degraded storage device according to some embodiments of the present disclosure.
Figure 9:
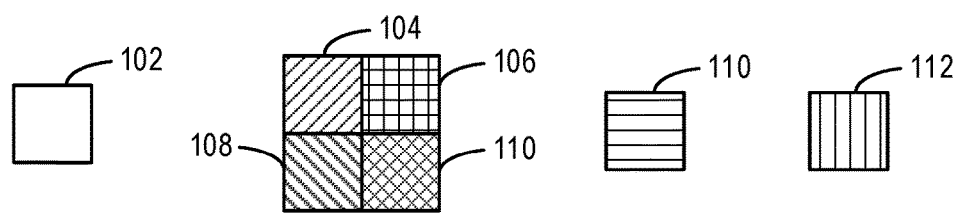

FIG. 9 illustrates a diagram of a mapped RAID 100 including a degraded storage device according to some embodiments of the present disclosure. As shown in FIG. 9, the storage device 2 is marked as a degraded storage device. In the case, all the used storage extents in the degraded storage device 2 are migrated to other storage devices of the RAID. For example, the storage extent D2 in the storage device 2 is migrated to the storage device 3, and the storage extent D3 in the storage device 2 is migrated to the storage device 1.

In some embodiments, if the storage device 2 is recovered to normal after a period of time, the degraded extent D2 of the storage device 2 is remarked as a normal extent, and the mapped RAID rebuilt data in-place at the storage extent D2. For example, the in-place rebuilding can be implemented by reading data through other storage extents (D0, D1, D3 and P) of the RAID extent where the storage extent D2 is located, and performing an XOR operation for these data. In some embodiments, if the response time of the storage device 2 decreases below a fourth threshold, the storage device 2 is marked as a normal storage device, and the degraded extent D2 therein is remarked as a normal extent. The fourth threshold can be less than the first threshold, which can be 1/10 of the first threshold, for example. For example, the storage device 2 as shown in FIG. 8 can be recovered to the state as shown in FIG. 2.

Figure 10:
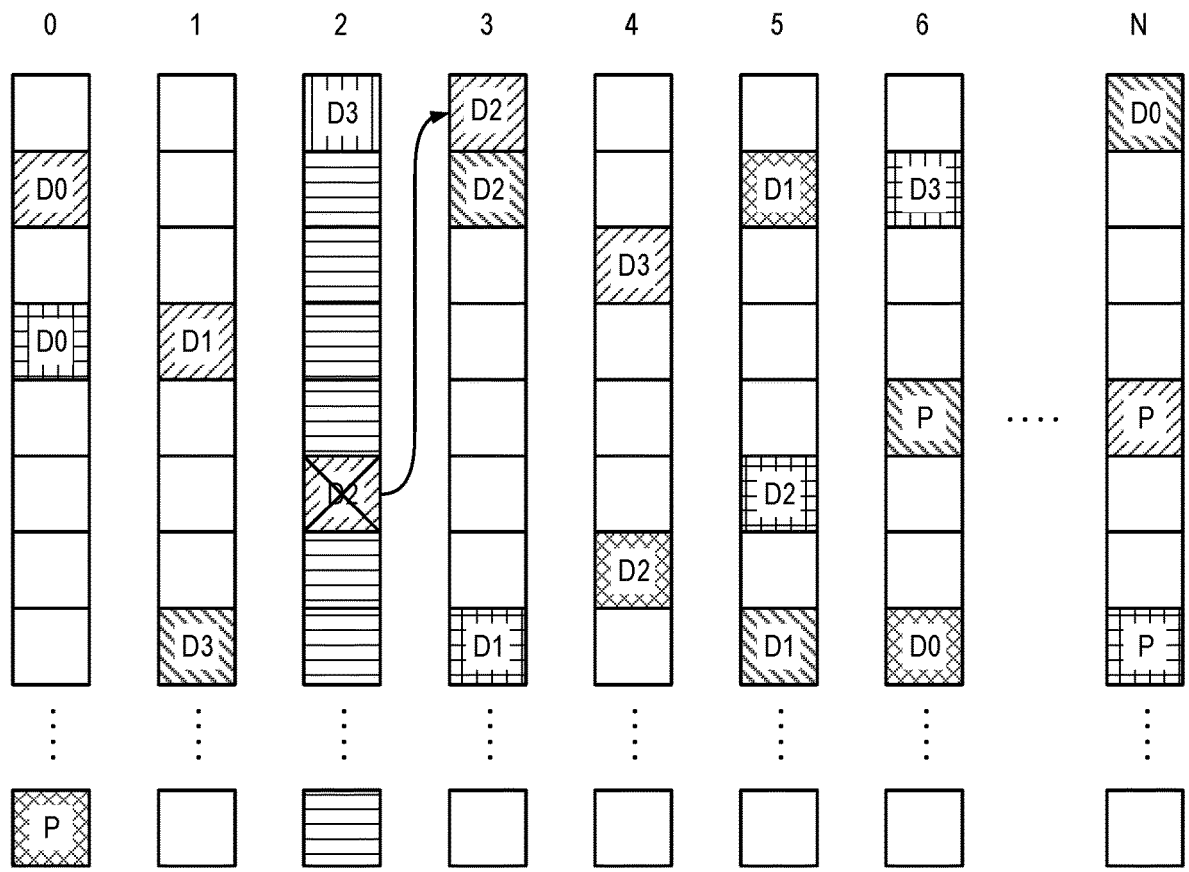
FIG. 10 illustrates a diagram of migrating a degraded extent to another storage device according to some embodiments of the present disclosure.
Figure 10:
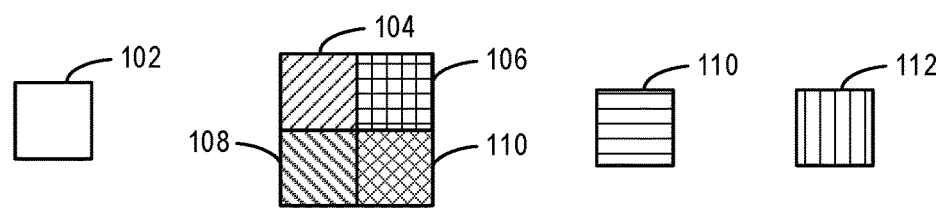

In some embodiments, if it still fails to recover the storage device 2 to normal after a period of time, the degraded storage extent D2 of the storage device 2 is migrated to another storage device. The storage extents not marked as degraded extents continue serving I/Os, while the storage extents marked as degraded extents can be marked dead, as shown in FIG. 10.

Through the partial rebuilding method, the I/O load on the slow storage device can be further reduced, because the storage load with the highest write load does not serve the I/Os. In addition, if the storage device is recovered to normal shortly, it is required to rebuild only several storage extents, rather than the whole storage device. If the storage device is much slower than other storage devices, partial rebuilding can balance the I/O dynamically to other storage devices. If the storage device is too slow due to a hardware/software problem, partial rebuilding will detect the problem quickly and disable the storage device as soon as possible, for further maintenance.

Figure 11:
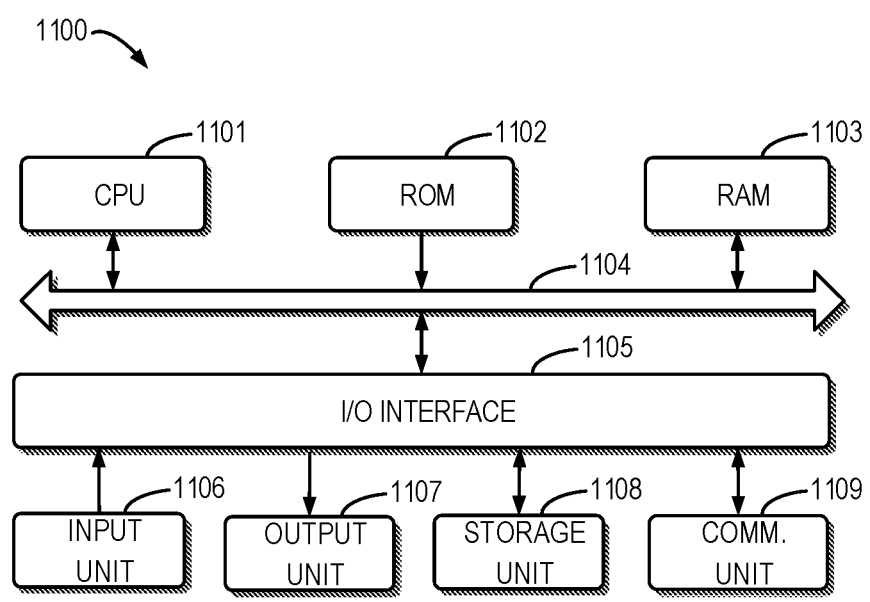
FIG. 11 illustrates a block diagram of an example device that can be used to implement embodiments of the present disclosure.

FIG. 11 illustrates a device 1100 that can implement embodiments of the present disclosure. As shown, the device 1100 includes a central processing unit (CPU) 1101 that can perform various appropriate acts and processing based on computer program instructions stored in a read-only memory (ROM) 1102 or computer program instructions loaded from a storage unit 1108 to a random access memory (RAM) 1103. In the RAM 1103, there further store various programs and data needed for operations of the device 1100. The CPU 1101, ROM 1102 and RAM 1103 are connected to each other via a bus 1104. An input/output (I/O) interface 1105 is also connected to the bus 1104.

The following components in the device 1100 are connected to the I/O interface 1105: an input unit 1106, such as a keyboard, a mouse and the like; an output unit 1107, such as various kinds of displays and a loudspeaker, etc.; a storage unit 1108, such as a magnetic disk, an optical disk, and etc.; a communication unit 1109, such as a network card, a modem, and a wireless communication transceiver, etc. The communication unit 1109 allows the device 1100 to exchange information/data with other devices through a computer network such as the Internet and/or various kinds of telecommunications networks.

Various processes and processing described above, e.g., the methods 200-400, can be executed by the processing unit 1101. For example, in some embodiments, the methods 200-400 can be implemented as a computer software program that is tangibly embodied on a machine readable medium, e.g., the storage unit 1108. In some embodiments, part or all of the computer programs can be loaded and/or mounted onto the device 1100 via ROM 1102 and/or communication unit 1108. When the computer program is loaded to the RAM 1103 and executed by the CPU 1101, one or more steps of the methods 200-400 as described above can be executed.

The present disclosure can be a method, a device, a system and/or a computer program product. The computer program product can include a computer readable storage medium on which computer readable program instructions are carried out for performing each aspect of the present application.

The computer readable medium may be a tangible medium that may contain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (or specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a Redundant Array of Independent Disks (RAID), comprising:
    comparing a response time of a first storage device in the RAID to a first threshold; and
    in response to the response time of the first storage device exceeding the first threshold, configuring the first storage device as a pseudo-degraded storage device, such that the pseudo-degraded storage device is responsive to write I/O requests only, at least in part by:
        in response to receiving a read I/O request for reading first data from the pseudo-degraded storage device, reading the first data from a second storage device of the RAID, and
        in response to receiving a write I/O request for writing second data to the pseudo-degraded storage device, writing the second data to the pseudo-degraded storage device by writing the second data immediately upon receipt of the write I/O request directly to the first storage device while the first storage device is configured as the pseudo-degraded storage device.

2. The method of claim 1, wherein the first storage device is a storage device in the RAID with the longest response time.

3. The method of claim 1, wherein writing the second data to the pseudo-degraded storage device comprises:
    reading, from the second storage device of the RAID, data associated with the write I/O request to calculate parity data; and
    writing the parity data to a parity storage device in the RAID.

4. The method of claim 1, further comprising:
    in response to the response time of the pseudo-degraded storage device decreasing below a second threshold for a predetermined period of time, configuring the pseudo-degraded storage device as a normal storage device, the second threshold being less than the first threshold.

5. The method of claim 1, further comprising:
in response to the response time of the pseudo-degraded storage device exceeding a third threshold, ignoring a write I/O request for an extent in the pseudo-degraded storage device with a highest write load, the third threshold being greater than the first threshold.

6. The method of claim 5, further comprising:
adding the extent into a list of degraded extents of the pseudo-degraded storage device; and
in response to the number of degraded extents in the list of degraded extents exceeding a predetermined threshold, migrating extents in the pseudo-degraded storage device to a third storage device in the RAID.

7. The method of claim 5, further comprising:
in response to a response time of the extent decreasing below a fourth threshold within a predetermined period of time, performing a data rebuild operation on the extent, the fourth threshold being less than the first threshold.

8. The method of claim 7, further comprising:
in response to the response time of the extent failing to decrease to the fourth threshold within the predetermined period of time, migrating the extent to a spare extent in a fourth storage device in the RAID.

9. A device for managing a Redundant Array of Independent Disks (RAID), comprising:
a processing unit;
a memory coupled to the processing unit and comprising instructions stored thereon, the instructions, when executed by the processing unit, causing the device to perform acts comprising:
comparing a response time of a first storage device in the RAID to a first threshold; and
in response to the response time of the first storage device exceeding the first threshold, configuring the first storage device as a pseudo-degraded storage device, such that the pseudo-degraded storage device is responsive to write I/O requests only, at least in part by:
in response to receiving a read I/O request for reading first data from the pseudo-degraded storage device, reading the first data from a second storage device of the RAID, and
in response to receiving a write I/O request for writing second data to the pseudo-degraded storage device, writing the second data to the pseudo-degraded storage device by writing the second data immediately upon receipt of the write I/O request directly to the first storage device while the first storage device is configured as the pseudo-degraded storage device.

10. The device of claim 9, wherein the first storage device is a storage device in the RAID with the longest response time.

11. The device of claim 9, wherein writing the second data to the pseudo-degraded storage device comprises:
reading, from the second storage device of the RAID, data associated with the write I/O request to calculate parity data; and
writing the parity data to a parity storage device in the RAID.

12. The device of claim 9, wherein the acts further comprise:
in response to the response time of the pseudo-degraded storage device decreasing below a second threshold for a predetermined period of time, configuring the pseudo-degraded storage device as a normal storage device, the second threshold being less than the first threshold.

13. The device of claim 9, wherein the acts further comprise:
in response to the response time of the pseudo-degraded storage device exceeding a third threshold, ignoring a write I/O request for an extent in the pseudo-degraded storage device with a highest write load, the third threshold being greater than the first threshold.

14. The device of claim 13, wherein the acts further comprise:
adding the extent into a list of degraded extents of the pseudo-degraded storage device; and
in response to the number of degraded extents in the list of degraded extents exceeding a predetermined threshold, migrating extents in the pseudo-degraded storage device to a third storage device in the RAID.

15. The device of claim 13, wherein the acts further comprise:
in response to a response time of the extent decreasing below a fourth threshold within a predetermined period of time, performing a data rebuild operation on the extent, the fourth threshold being less than the first threshold.

16. The device of claim 15, wherein the acts further comprise:
in response to the response time of the extent failing to decrease to the fourth threshold within the predetermined period of time, migrating the extent to a spare extent in a fourth storage device in the RAID.

17. A computer program product having a non-transitory computer readable medium which stores a set of instructions to manage a Redundant Array of Independent Disks (RAID); the set of instructions, when carried out by computerized circuitry, causing the computerized circuitry to perform a method of:
comparing a response time of a first storage device in the RAID to a first threshold; and
in response to the response time of the first storage device exceeding the first threshold, configuring the first storage device as a pseudo-degraded storage device, such that the pseudo-degraded storage device is responsive to write I/O requests only, at least in part by:
in response to receiving a read I/O request for reading first data from the pseudo-degraded storage device, reading the first data from a second storage device of the RAID, and
in response to receiving a write I/O request for writing second data to the pseudo-degraded storage device, writing the second data to the pseudo-degraded storage device by writing the second data immediately upon receipt of the write request directly to the first storage device while the first storage device is configured as the pseudo-degraded storage device.

18. The method of claim 1, further comprising, in response to the response time of the first storage device exceeding the first threshold:
sorting response times of all storage devices in the RAID; and
wherein configuring the first storage as the pseudo-degraded storage device is further responsive to a determination made based on the sorting that the first storage device has a longest response time of all storage devices in the RAID.

19. The method of claim 1, wherein the write I/O request is received by the RAID; and
   wherein the second data is written to the pseudo-degraded storage device immediately upon receipt of the write I/O request by the RAID.

20. The method of claim 19, wherein no received read I/Os are sent by the RAID to the storage device while the storage device is configured as the pseudo-degraded storage device.

\* \* \* \* \*